United States Patent [19]

Ress et al.

[11] Patent Number: 4,670,274

[45] Date of Patent: Jun. 2, 1987

[54] PROCESS FOR CONTROLLING THE GERMINATION OF MALTING BARLEY

[75] Inventors: Piroska Ress, Budaörs; István Kiss, Budapest; Géza Miltényi, Isaszeg; Antal Stráhl, Budapest; Imre Petró, Budapest; József Farkas, Budapest; Péter Biacs, Budapest; Istvánné Kozma, Budapest; István Debreczeny, Budapest, all of Hungary

[73] Assignees: Kobanyai Sorgyar; Kozponti Elelmiszeripari Kutato Intezet, both of Budapest, Hungary

[21] Appl. No.: 807,656

[22] PCT Filed: Apr. 1, 1985

[86] PCT No.: PCT/HU85/00020

§ 371 Date: Nov. 25, 1985

§ 102(e) Date: Nov. 25, 1985

[87] PCT Pub. No.: WO85/04415

PCT Pub. Date: Oct. 10, 1985

[30] Foreign Application Priority Data

Apr. 2, 1984 [HU] Hungary ............................. 13184/84

[51] Int. Cl.$^4$ ............................................... A23L 3/26
[52] U.S. Cl. ..................................... 426/240; 426/507
[58] Field of Search ......................... 426/240, 242, 507

[56] References Cited

FOREIGN PATENT DOCUMENTS 59-48963 11/1984 Japan ................................... 426/240

OTHER PUBLICATIONS

Söripar, 1963, 44–48, 81–83 Hungarian text, translated into English pp. 1–11 and 1–6 respectively.

*Primary Examiner*—George Yeung
*Attorney, Agent, or Firm*—Karl F. Ross; Herbert Dubno

[57] ABSTRACT

The present invention relates to controlling germination of barley in the malting process. More particularly, the invention relates to the treatment of malting barley by ionizing radiation prior to the malting process.

1 Claim, No Drawings

PROCESS FOR CONTROLLING THE GERMINATION OF MALTING BARLEY

SPECIFICATION

1. Cross Reference to Related Applications

This application is a National Phase Application, correponding to PCT/HU85/00020 filed Apr. 5, 1985 under the Patent Cooperation Treaty and based, in turn, upon a Hungarian application 1318/84 of Apr. 2, 1984 under the International Convention.

2. Field of the Invention

The present invention relates to controlling germination of barley in the malting process. More particularly, the invention relates to the treatment of malting barley by ionizing radiation.

BACKGROUND OF THE INVENTION

The extension of brewing production is basically limited by the scope of malt production. This step needs substantial equipment and work and is very energy consuming and it is very hard to develop extensively. Thus, world-wide research has been carried out in the field of intensive development in order to save material and energy and to increase capacity.

Germination is a physiological process which takes place only under controlled conditions in the presence of sufficient humidity, heat and oxygen. By altering these conditions the biological processes may be controlled within certain ranges but these ranges are very limited.

The metabolism of barley can be influenced by plant hormones, natural and artificial inhibitors, as well as by physical methods. Generally, the materials influencing the development of germination may cause stimulation or inhibition depending on the concentration thereof. Many chemicals have been suggested for inhibiting the germination of barley. Kirsop and Pollock, Proc. European Brewery Com., 84, 1957 suggests the use of comarin; Rázga in Söripar, 169 (1961) discloses the effect of sodium azide. Potassium bromate may also be used according to Macey and Stowell, J. Inst. Brewing, 63, 391 (1957).Narziss: A sörgyártás, Budapest, 1981 describes the use of nitric acid while Gy. Kollár: Mezögazdasági Kémia Technológiai Tanszék Közlemények, 1960 suggests the use of phenylacetic acid, 2,4-dichlorophenoxy acetic acid or beta-oxy-phenylacetic acid.

Among the materials stimulating germination the best known is gibberellic acid which results in an enhanced enzyme induction. This enhanced enzymatic effect cannot be controlled, however; thus the malt having been germinated by the addition of gibberellic acid is liable to dissolve to a greater extent than is necessary which can result in enhanced coloring during drying and in an increased malting loss. In order to avoid these unfavorable results, combined methods are used, e.g. the unfavorable effects of gibberellic acid are compensated with potassium bromate.

The chemical methods have the disadvantage that malt contains residues due to the treatment.

It is well known that certain residues have strong influence on the metabolism of plants. These can stimulate or inhibit the development of germ depending on the dose.

Kiss et al., Söripar, 44 to 48 and 81 to 83, 1963 have already examined the influence of ionizing rays on the germination of barley. They came to the conclusion that the dose of radiation essentially did not influence the enzymatic system.

DESCRIPTION OF THE INVENTION

It has now surprisingly been found that when malting barley is irradiated with a dose of 0.05 to 0.15 kGy, germination is inhibited to certain extent while, at the same time, a stimulating effect occurs as to the enzyme activity. This result could not be foreseen since, while alpha-amylase activity is known to increase at low dose ranges, it has been found that this increase in activity is not followed by activation of the peptidase system. On the contrary, the use of higher doses was found to result in permanent inhibition of the inductive enzyme system.

By using the process according to the invention, both in micro-malting equipment and in industrial scale, hydrolase-rich malt was prepared wherein the over-solution phenomena which occurs by using chemical stimulants or stimulating radiation doses, were eliminated.

According to the method of the preent invention air-dry, suitably purified malting barley is irradiated with any radiation source known per se, emitting ionizing rays, so that the average dose absorbed should fall within the above range. The barley thus irradiated can be used in the common malting process. By using the barley as treated above, the germinating period is shortened to 5 to 6 days from the usual 7 days and the extract yield increased by 0.05%. As mentioned above, the radiation treatment should be carried out in the starting stage of the processing; suitably germination of the treated barley should start within a week from irradiation as the inductive effect of irradiation treatment tends to decline during storage.

The processing according to the present invention is illustrated by the following example more in details, without limiting the scope of protection to the specific process as herebelow.

EXAMPLE

In the followings the malting process of TRUMF barley stimulated by irradiation treatment is illustrated. Dose optimum of the sort is 0.1 kGy, tolerance: 0.085 to 0.115 kGy.

Purified and classified air-dry TRUMF malting barley (humidity: 11.9%) was irradiated with ionizing rays so that the absorbed average dose was 0.1±0.015 kGy. The parameters of the raw material used was as follows:

Swelling capacity: 97.5%
Weight of 1000 grains: 40.97 g
Protein content: 12.12%
Extract prediction: 79.5%
Germination capacity: 97.7%
Germinative energy: 96.6%.

The barley thus treated is steeped suitably immediately, but within 6 days at the latest.

The steeping is performed with cold (10° to 12° C.) water as the irradiated barley absorbs water faster than the control. The steeping period is shortened to 48 hours from the usual 54 hours and during this time the barley absorbs 40 to 42% of the water necessary for germination. The technology of steeping should not be altered, any known steeping method is applicable provided that water is changed in time and the water contains a sufficient amount of dissolved oxygen. The use of secondary waters of high temperature reduces the stimulation effect. At the end of steeping, the rootlets were noted at the edge of grain. By using higher steeping temperature (14° C.) the same can be observed even after 24 to 30 hours.

The germination can also be carried out in any standard germinating equipment. The barley having been steeped with 40 to 42% of water content can be germinated to well dissolved green malt within 6 days on floor malting or within 5 days in pneumatic systems. The technology of turning in floor malting is the same as the traditional method, the water content should be kept at 95% and the air temperature is to be maintained at 10° C. On the 3rd and 4th days strong germination can be observed, at that time should the temperature of the pile use to over 19° C., one more turning is to be inserted in such case.

In pneumatic systems the technology of loosening should not be altered; germination is controlled by the temperature of the inflow air. At the start a wetted inflow air of 16° C. is used while on the 2nd day the temperature is decreased to 15° C. On the 3rd day strong germination can be observed and the temperature of the pile increases to 19° to 20° C.

On the 6th day when using floor malting or on the 5th day when using pneumatic system the green malt is transferred for kilning and dried by methods known per se. Thus, malt having the following parameters is obtained:

|  | Irradiated | Control |
| --- | --- | --- |
| Fine extract % | 81.5 | 80.9 |
| Raw extract % | 79.6 | 79.0 |
| Difference % | 1.86 | 1.87 |
| Saccharification | 10–15 | 10–15 |
| Final fermentation % | 79.6 | 79.5 |
| Diasthetic capacity WKE | 194 | 167 |
| Color EBC | 2.0 | 2.0 |
| Total protein % | 11.4 | 11.3 |
| Dissolved N mg/100 g dry substance | 655 | 657 |
| Kolbach number % | 40.1 | 40.0 |
| Lumdin fractions |  |  |
| A % | 23.3 | 21.9 |
| B % | 16.6 | 16.8 |
| C % | 60.1 | 61.3 |
| Hartong number | 5.8 | 6.1 |

We claim:
1. A method of germinating barley in a malting process, comprising the steps of:
   irradiating air-dried barley with a dose of 0.05 to 0.15 kGy of ionizing radiation to selectively stimulate peptidase enzymatic activity; and
   within 7 days steeping the irradiated barley to induce germination thereof.

* * * * *